United States Patent [19]
Hirata

[11] Patent Number: 5,404,443
[45] Date of Patent: Apr. 4, 1995

[54] DISPLAY CONTROL SYSTEM WITH TOUCH SWITCH PANEL FOR CONTROLLING ON-BOARD DISPLAY FOR VEHICLE

[75] Inventor: Toru Hirata, Kanagawa, Japan

[73] Assignee: Nissan Motor Company, Limited, Kanagawa, Japan

[21] Appl. No.: 997,621

[22] Filed: Dec. 24, 1992

Related U.S. Application Data

[63] Continuation of Ser. No. 554,689, Jul. 19, 1990, abandoned.

[30] Foreign Application Priority Data

Jul. 25, 1989 [JP] Japan ................. 1-86509 U

[51] Int. Cl.6 ............................................. G06F 15/62
[52] U.S. Cl. ................... 395/161; 395/162; 364/424.01
[58] Field of Search ........... 340/712, 706, 703, 438, 340/441, 461, 463, 932.2; 358/349, 33, 145, 165, 147, 349, 188; 364/188, 424.01–424.05; 395/155–161; 307/9.1, 10.1, 10.3, 10.6; 343/711–713; 369/6; 301/43

[56] References Cited

U.S. PATENT DOCUMENTS

| | | | |
|---|---|---|---|
| 3,673,327 | 6/1972 | Johnson et al. | 340/712 |
| 4,564,917 | 1/1986 | Yamada et al. | 364/424.01 |
| 4,646,089 | 2/1987 | Takanabe et al. | 364/424.01 |
| 4,672,558 | 6/1987 | Beckes et al. | 340/712 |
| 4,712,191 | 12/1987 | Penna | 340/712 |
| 4,722,005 | 1/1988 | Ledenbach | 358/16 B |
| 4,731,769 | 3/1988 | Schaefer et al. | 361/6 |
| 4,742,393 | 5/1988 | Sugai et al. | 358/188 |
| 4,787,040 | 11/1988 | Ames et al. | 364/424.01 |
| 4,811,240 | 3/1989 | Ballou et al. | 395/155 |
| 4,823,142 | 4/1989 | Ohe et al. | 343/713 |
| 4,827,520 | 5/1989 | Zeinstra | 381/43 |
| 4,833,592 | 5/1989 | Yamanaka | 364/188 |
| 4,845,505 | 7/1989 | Ohe et al. | 343/712 |

OTHER PUBLICATIONS

Sakakawa, 62-166116, Japan, abstract, Jul. 1987.
Ito et al., 59-267397, Japan, abstract, Jul. 1986.
Matsuoka, 61-84240, Japan, abstract, Oct. 1987.
Tojo, JP 63-310284, Apr. 12, 1989, abstract, (1 sheet).
Ikeda, JP 60-165177, Jan. 7, 1986, abstract (1 sheet).
Tsuboi, JP 60-214175, Mar. 11, 1986, abstract, (1 sheet).
Sakaguchi, JP 61-198975, Jan. 29, 1987, abstract, drawing (2 sheets).
Ooyama, JP 61-105638, May 6, 1988, abstract, (1 sheet).
Steinberg, "Playing the Ultimate Trump Car", P.C. Week, Jun. 28, 1988, p. c30.
"Can Touch-Screen Technology Move Beyond Special Uses?", Tobias Naegele, Electronics, May 5, 1986, pp. 42–43.
"GM Tests Video Display In 1984 Production Car", David M. Weber, Electronics Week, Nov. 12, 1984, pp. 28–29.

*Primary Examiner*—Mark R. Powell
*Assistant Examiner*—John E. Breene
*Attorney, Agent, or Firm*—Lowe, Price, LeBlanc & Becker

[57] ABSTRACT

A display system for a vehicle is provided. This system is operable to selectively provide information such as vehicle condition, television broadcasts, or so forth in the form of images in a plurality of modes. The system includes a touch switch which is responsive to contact of a user's finger with a screen of the display to provide a signal. When the user touches the screen after interrupting the image on the display, the system displays the image in the mode selected before the display interruption.

8 Claims, 3 Drawing Sheets

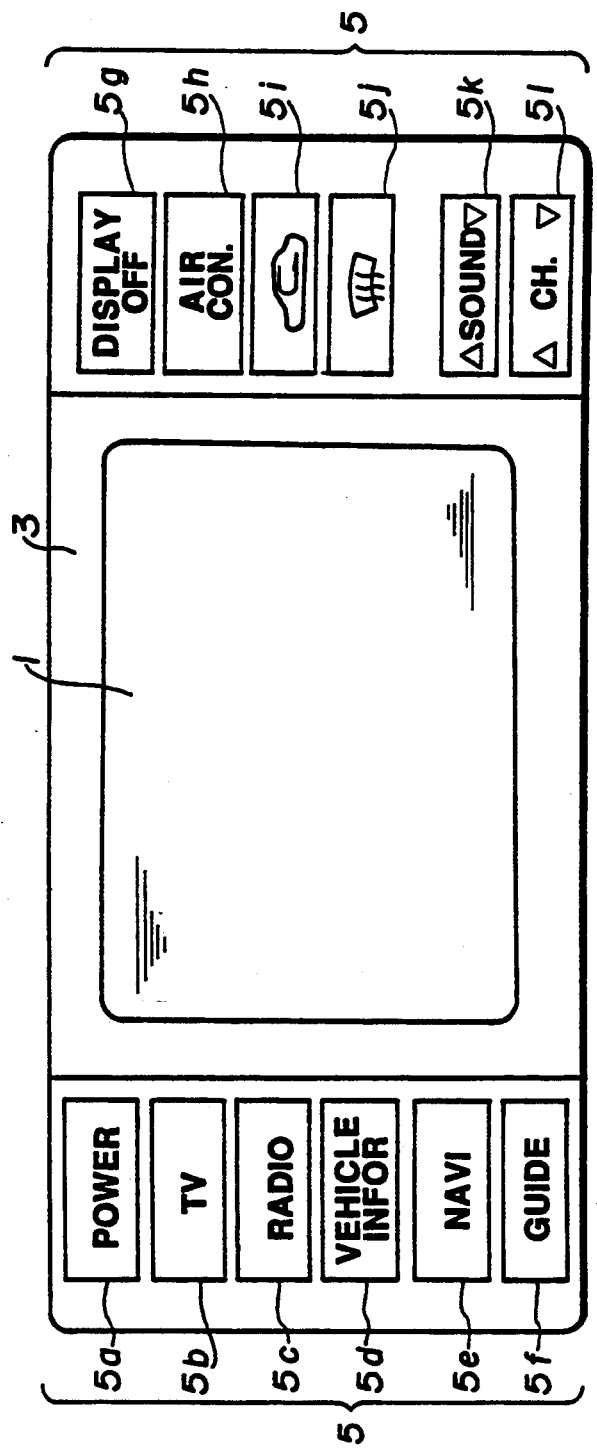
FIG. 1
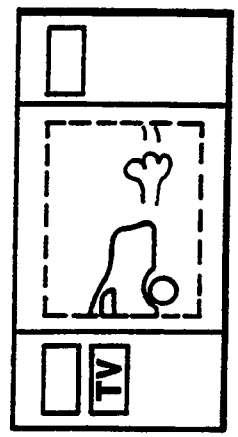
FIG. 4(C) (TELEVISION IMAGE / TELEVISION SOUND)
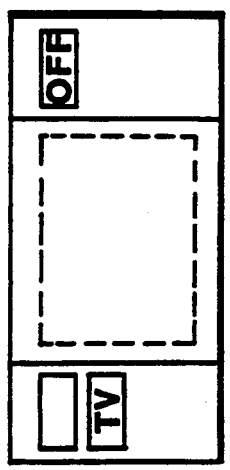
FIG. 4(B) (IMAGE BLANKED / TELEVISION SOUND)
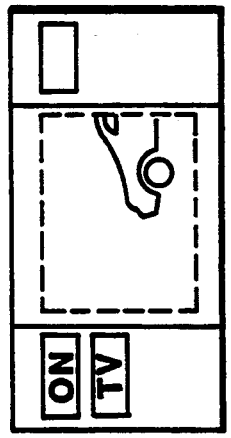
FIG. 4(A) (TELEVISION IMAGE / TELEVISION SOUND)

DISPLAY CONTROL SYSTEM WITH TOUCH SWITCH PANEL FOR CONTROLLING ON-BOARD DISPLAY FOR VEHICLE

This application is a continuation of application Ser. No. 07/554,689, filed Jul. 19, 1990, now abandoned.

BACKGROUND OF THE INVENTION

1. Technical Field

The present invention relates generally to a display system. More particularly, the invention relates to a display system which facilitates operation to provide visual information again after temporarily eliminating the visual display.

2. Background Art

A display system for a vehicle is generally well known in the art which includes a plurality of control switches on both sides of a display monitor. A driver can operate any one of the switches to provide visual information of interest to the driver.

However, in such a conventional display system, if a driver operates a display turn-off switch to switch-off the current screen display and subsequently wants to select the same mode again, the same sequential operation as previously performed is again necessary.

Additionally, if the driver operates the control switch incorrectly with the intention of restoring the same images after an interrupt, the display may be changed to a different mode to provide undesired visual information to the driver.

SUMMARY OF THE INVENTION

It is accordingly one object of the present invention to avoid the disadvantages of the prior art.

It is another object of the invention to provide a display system which facilitates operation to conveniently provide visual information again after an interrupt period.

According to one aspect of the present invention, there is provided a display system for a vehicle which comprises a display means displaying visual information, a first selector means for selecting an operating mode of interest to a user from among a plurality of operating modes each displaying different visual information on the display means, a second selector means for varying a mode parameter applicable to the present operating mode from among a plurality of mode parameters, a switch means responsive to manual operation by the user to provide a signal indicative thereof, and a control means responsive to the selecting operation by the first selector means to retain the present operating mode and the mode parameter, the control means responsive to the signal from the switch means to restore the visual information to the display means in accordance with the retained operating mode and mode parameter.

According to another aspect of the invention, there is provided a display system for a vehicle which comprises a display means for displaying an image of interest to a user in a plurality of different modes, a selector means responsive to manual operation of the user to select one mode from among the different modes, a first switch means for eliminating the image provided on the display means, a second switch means responsive to manual operation of the user after the image eliminating operation by the first switch means to provide a signal indicative thereof, and a control means responsive to the image eliminating operation by the first switch means to memorize the mode of the selector means at that time, the control means responsive to the signal from the second switch means to reproduce the memorized mode so as to display the image again.

According to a further aspect of the invention, there is provided a display system for a vehicle which comprises a display means having a plurality of operating modes each displaying different visual information, a selector means for selecting an operating mode of interest to a user from among the plurality of operating modes, a first switch means for blanking the visual information displayed on the display means, a second switch means responsive to manual operation of the user after the blanking operation by the first switch means to provide a signal indicative thereof, a control means responsive to the signal from the second switch means to release the blanking operation of the first switch means so as to display the visual information again in the same mode as selected prior to the blanking operation of the first switch means.

BRIEF DESCRIPTION OF THE DRAWINGS

FIG. 1 is a front view which shows a display monitor incorporated in a display system according to the present invention.

FIGS. 4(A) to 4(C) are explanatory views which show an operational sequence of a display system of the invention.

DESCRIPTION OF THE PREFERRED EMBODIMENT

Figure 2:
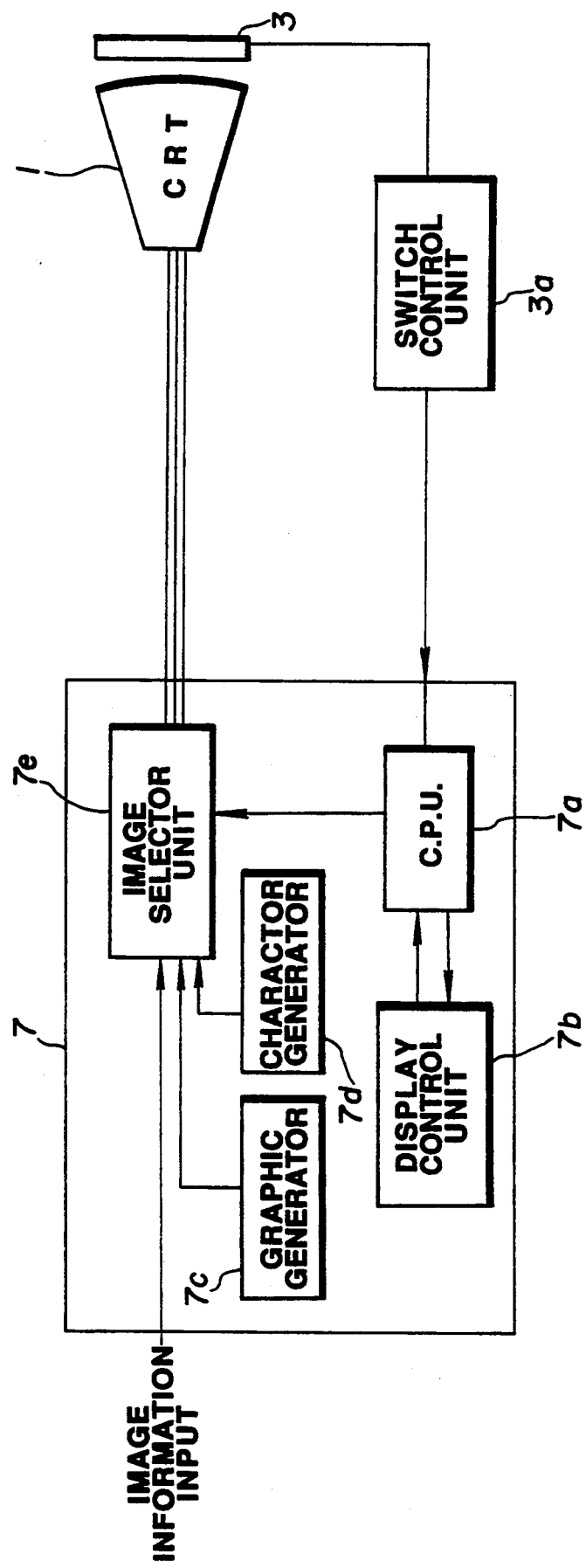
FIG. 2 is a block diagram which shows a display system of the invention.

Referring now to the drawings, particularly to FIG. 1, there is shown a display monitor incorporated in a display system for a vehicle according to the present invention. This monitor includes generally a display 1, a touch switch panel 3, and a plurality of control switches 5 arranged on both sides of the display.

The display 1 is provided with a CRT (Cathode Ray Tube) and provides visual images according to various information from a system control unit as will be described hereinafter in detail. The touch switch panel 3 is disposed on the periphery of the display 1 and internally arranges a plurality of pairs comprising a light emitting diode and a light receiving diode which are diametrically opposed to each other on the display 1 to define coordinates thereon. Touching a screen of the display with a user's finger causes the light emitting diodes corresponding to the touched area to be interrupted, the corresponding light receiving diodes thereby providing signals indicative thereof to a switch control unit as will be described hereinafter.

The control switches 5a to 5f are arranged the left side of the display, which include a power source switch 5a, a television selector switch 5b, a radio selector switch 5c, a vehicle information selector switch 5d, a navigation switch 5e, and a traffic guide information switch 5f. Arranged on the right side of the display are control switches 5g to 5l which include a display turn-off exclusive switch 5g, an air conditioner switch 5h, an air-intake-door switch 5i, defroster switch 5j, a sound volume switch 5k, and a channel selector switch 5l.

For operation of the switches, the power source switch 5a serves to turn on and off power supply for the on board display system. The television selector switch 5b, the radio selector switch 5c, the vehicle information selector switch 5d, the navigation switch 5e, and the traffic guide information switch 5f are so-called mode selector switches for selecting a mode of interest to a user or driver. The driver can choose a desired one from the switches 5b to 5f to receive television or radio broadcasts or to obtain traffic or map information.

The display turn-off switch 5g serves to provide a blank signal to erase images displayed on the screen. Independent of operation of the display turn-off switch, the sound of the displayed images continues to be output from the vehicle speakers. Television images on the display when the television mode switch 56 is active are automatically blanked when the vehicle is in motion in response to the blank signal which is output automatically upon vehicle movement, independent of operation of the display turn-off switch 5g.

The air conditioner switch 5h, the air intake door switch 5i, and the defroster switch 5j are associated with an air conditioner. Depression of the air conditioner switch 5h causes a fan speed (air capacity), an air outlet position, automatic air control status, compressor status, and a set temperature to be indicated on the display.

The air intake door switch 5i sets an air inlet to select between intake of fresh-air and recirculation of inside air. The defroster switch 5j serves to set an air outlet to a defroster side and to drive a compressor for introducing fresh-air. The sound volume switch 5k is provided with a seesaw switch (i.e., opposing incremented pressure switches) which is responsive to depression of the right side thereof to reduce the audio volume level while it is responsive to depression of the left side thereof to increase the audio volume level. The channel selector switch 5l is also provided a seesaw switch which is responsive to depression of the right side thereof to reduce a channel frequency while it is responsive to depression of the left side thereof to increase the channel frequency.

Referring to FIG. 2, the display system according to the present invention is shown. This system includes generally a switch control unit 3a and a system control unit 7. The switch control unit 3a receives a signal from the touch switch panel 3 in response to contact of the user's finger with the screen of the display to provide a signal to the system control unit 7. The system control unit 7 includes a main CPU 7a, a display control unit 7b, a graphic generator 7c, a character generator 7d, and an image selector unit 7e. The graphic generator provides graphic information to the image selector unit 7e. The character generator also provides character information to the image selector unit 7e. The image selector unit 7e further receives image information such as a television image through an antenna in addition to the information from the character and graphic generators to select the necessary input image data and compose them through the CRT. The main CPU receives a display control signal from the display control unit 7b. The main CPU further receives a signal from the switch control unit 3a in response to the signal from the touch switch panel 3 to provide a signal to the image selector unit 7e for releasing the screen blanking. It will be appreciated that when, during display of a television broadcast, the display turn-off switch is depressed or the vehicle starts to run, only the television image is eliminated from the screen while the sound remains output, subsequently, when the driver touches the screen, the main CPU outputs the signal to the image selector unit 7e to release the display blanking signal, and then the image selector unit 7e automatically provides images in the same mode as that before the screen blanking.

Figure 3:
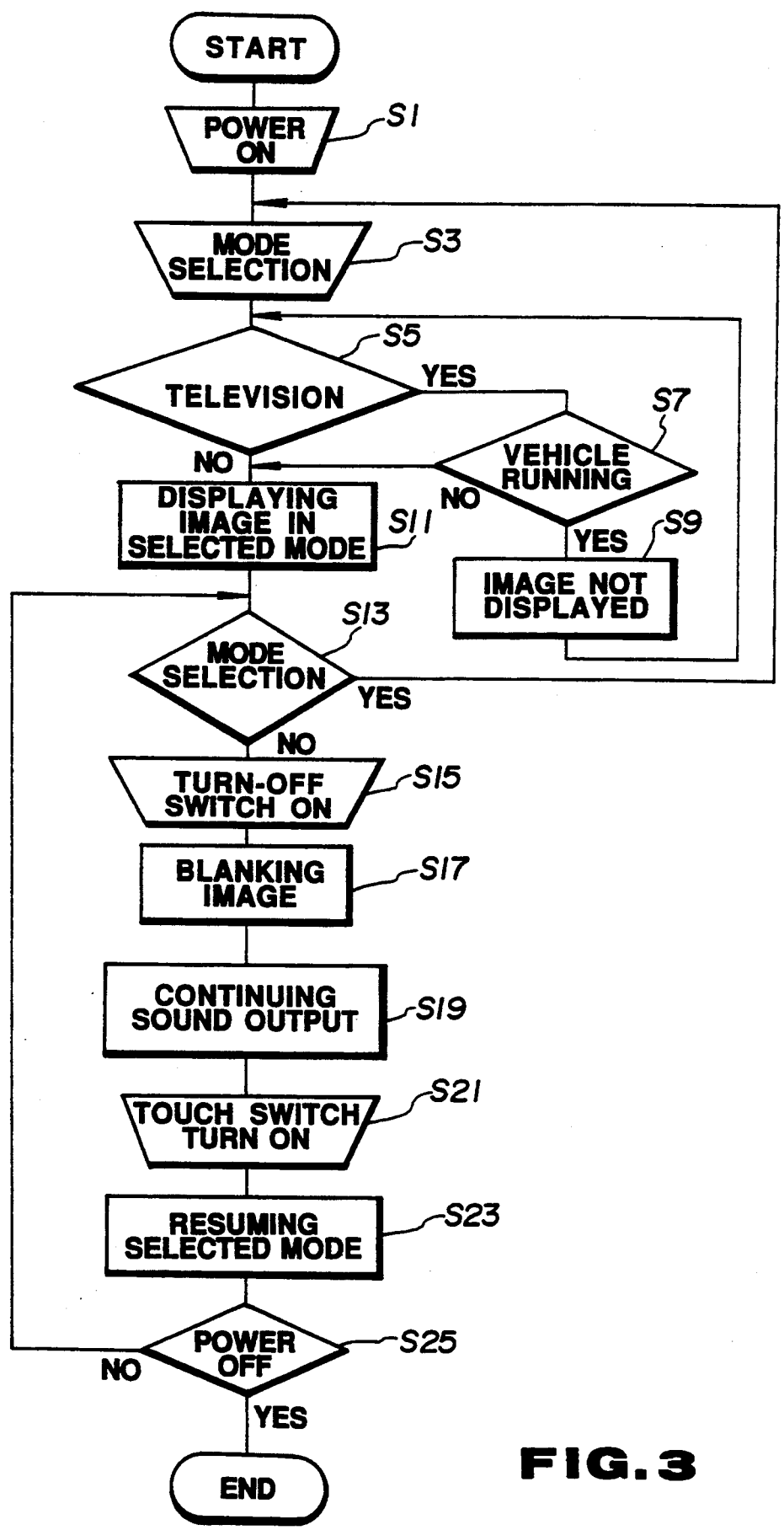
FIG. 3 is a flow chart which shows a program sequence performed by a display system of the invention.

Referring to FIG. 3, a flow chart is shown which represents a program, or sequence of logical steps, performed by the display system of the invention. After the turning on of the power switch 5a of the on board display system at step 1, the routine proceeds to step 3 in which a desired mode is selected by depressing any one of the mode selector switches by the user. The routine then proceeds to decision step 5 in which it is determined whether the television selector switch 5b is selected or not. If a YES answer is obtained, the display monitor 1 displays television broadcast as shown in FIG. 4(A) including the audio output from the vehicle speakers and the routine proceeds to decision step 7 in which it is determined whether the vehicle is running or not. If a YES answer is obtained, the routine proceeds to step 9 in which the blanking signal is output to the display monitor to eliminate the displayed image on the display 1 as shown in FIG. 4(B).

Alternatively, if in step 5 a mode other than the television switch 5b is selected or in step 7 determination is made that the vehicle is not moving while the display is in the television mode, the routine proceeds to step 11 in which images are displayed which correspond to a mode selected in step 3. In other words, images other than television may be displayed during vehicle driving, while television images are available only while the vehicle is not moving.

Subsequently in step 13, it is determined whether the user pushes any one of the mode switches again to change the present mode or not. If a YES answer is obtained, the routine directly proceeds to step 3.

In step 15, if the display turn-off switch 5g is depressed by the user, the routine proceeds to step 17 in which the blank signal is output to eliminate the displayed images as shown in FIG. 4(B), but sound corresponding to the displayed images is maintained from the speakers in step 19.

In step 21, if the user touches the screen of the display after the displayed image is blanked in step 17, the routine proceeds to step 23 in which the image is displayed again in the same channel as shown in FIG. 4. In other words, in response to contact of the user's finger with the screen, the display system automatically serves to provide image information again in the same mode as before the image blanking. The system thus retains the operating mode selected by the user to permit restoration of the visual information in accordance with the retained operating mode.

In step 25, it is determined whether the power source is turned off or not. If a NO answer is obtained, the routine is returned to step 13, while if a YES answer is obtained, the program is completed with operation of the display system being stopped.

Although the invention has been shown and described with respect to a best mode embodiment thereof, the invention is not limited to the above embodiment. For example, the touch switch panel may be spaced from the screen of the display with a certain gap in place of the touch switch panel which arranges a plurality of pairs of light emitting diode and light receiving diode adjacent the screen. With this arrangement, interruption of light transmitted from the light emitting diode is easily achieved by extending a hand near the screen of the display without touching thereon for displaying the erased images on the display again.

Additionally, a touch sheet made of transparent electrode which is bonded on the screen of the display may be used in place of the touch switch panel. In the above embodiment, while the system is adapted for maintaining output of sound after depressing the display turn-off switch, the system may alternatively interrupt both the displayed image and its sound and may further memorize the mode (including a channel and a volume level etc.) selected by the driver to resume the interrupted mode in response to a signal from the touch switch panel.

Further, while the system is responsive to a signal from the touch switch panel after the image blanking operation to restore the image to the display in accordance with the mode prior to the image blanking operation, the system is also responsive to a signal from the touch switch panel to resume a previously set mode from a presently held mode. For example a user has set the display in the navigation mode and then has subsequently changed the display to the television mode, the system of the invention is operable to restore the navigation mode to the display without blanking the screen upon receiving a signal from the touch switch panel.

What is claimed is:

1. An automobile display control system in combination with an on-board display for displaying visual information on a screen and arranged in a vehicle, said control system operating for controlling said display, comprising:

selector means for manually selecting an operating mode of interest to a user from among a plurality of operating modes, said display displaying different visual information at different operating modes, said selector means generating a selected operating mode indicative signal identifying a selected operating mode selected thereby;

display control means responsive to said selected operating mode indicative signal, for controlling said display to display particular visual information on said screen at the selected operating mode;

manually operated blanking switch means operating in a blanking state for blanking the particular visual information displayed on said screen in the selected operating mode and for generating a blanking signal when operating in said blanking state;

said control means being responsive to said blanking signal for controlling said display to blank the visual information displayed on said screen; and a touch switch panel disposed over said display for defining an entire switching area over an entire surface of said screen for sensing user contact with any portion of said entire switching area and for generating a user-contact indicative signal;

wherein said control means is responsive to said user-contact indicative signal in the presence of said blanking signal for shifting a state of said blanking switch means from said blanking state to a non-blanking state for re-displaying the visual information previously blanked by said blanking switch means.

2. The display control system as set forth in claim 1, further comprising run detecting means for detecting a running state of the vehicle and for generating a vehicle-running indicative signal, wherein said selector means includes means for selecting a television display mode for displaying a television broadcast image, and said blanking switch means comprises means responsive to said vehicle-running indicative signal for outputting to said control means a further blanking signal responsive to said vehicle-running indicative signal, said control means being responsive to said further blanking signal for controlling said display to blank the television broadcast image displayed on said screen when said television display mode is selected.

3. The display control system as set forth in claim 2, wherein said touch switch panel includes a plurality of pairs of corresponding light emitting and light receiving diodes diametrically opposed to each other around said screen, wherein a light receiving diode provides said user-contact indicative signal to said control means when a user's finger interrupts light transmission from a light emitting diode corresponding thereto.

4. The display control system as set forth in claim 3, wherein said selector means includes a plurality of user contact areas, each smaller than said touch switch panel, for generating a plurality of separate signals identifying user contacts with separate ones of said user contact areas, and wherein, in the presence of said blanking signal, said control means is responsive to said user-contact indicative signal for re-displaying the visual information in said selected operating mode previously selected by said selector means.

5. The display control system as set forth in claim 2, wherein when said control means responds to said further blanking signal by blanking only the television broadcast image displayed on said screen, while maintaining an output of an audio sound portion superposed on the television broadcast image.

6. The display control system as set forth in claim 5, wherein said selector means includes a plurality of user contact areas, each smaller than said touch switch panel, for generating a plurality of separate signals identifying user contacts with separate ones of said user contact areas, and wherein, in the presence of said blanking signal, said control means is responsive to said user-contact indicative signal for re-displaying the visual information in said selected operating mode previously selected by said selector means.

7. The display control system as set forth in claim 4, wherein said selector means includes a plurality of user contact areas, each smaller than said touch switch panel, for generating a plurality of separate signals identifying user contacts with separate ones of said user contact areas, and wherein, in the presence of said blanking signal, said control means is responsive to said user-contact indicative signal for re-displaying the visual information in said selected operating mode previously selected by said selector means.

8. The display control system as set forth in claim 1, wherein said selector means includes a plurality of user contact areas, each smaller than said touch switch panel, for generating a plurality of separate signals identifying user contacts with separate ones of said user contact areas, and wherein, in the presence of said blanking signal, said control means is responsive to said user-contact indicative signal for re-displaying the visual information in said selected operating mode previously selected by said selector means.

* * * * *